Feb. 7, 1961  D. W. BEEM ET AL  2,970,793
AIRCRAFT
Filed Feb. 14, 1958  2 Sheets-Sheet 1
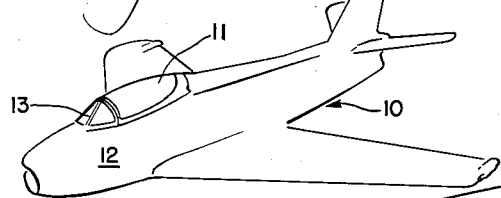
Fig. 1
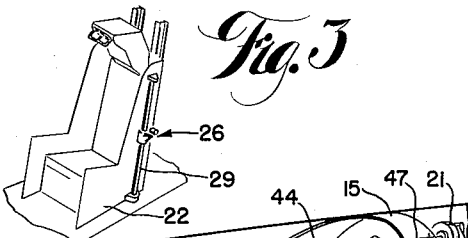
Fig. 3
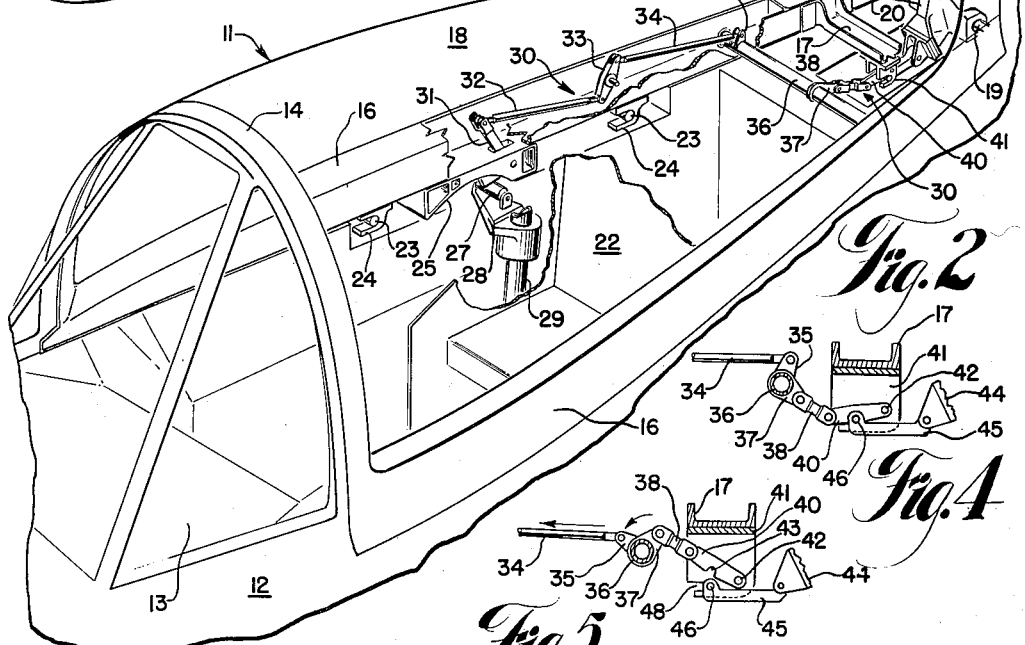
Fig. 2
Fig. 4
Fig. 5
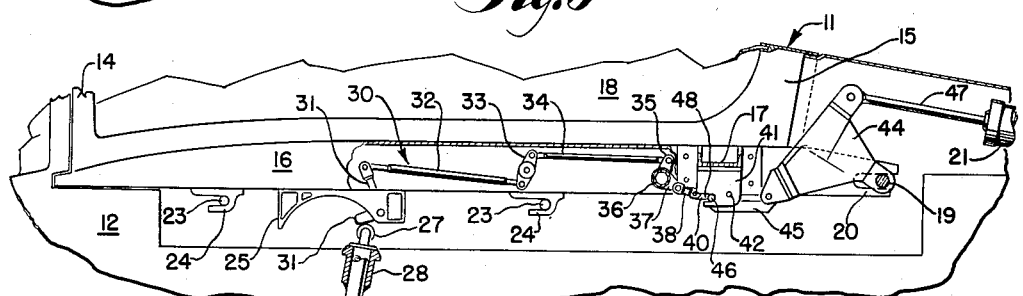
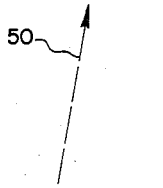
Fig. 6
INVENTORS
DONALD W. BEEM
RAMON E. CONRAD
BY
ATTORNEY Feb. 7, 1961 D. W. BEEM ET AL 2,970,793
AIRCRAFT
Filed Feb. 14, 1958 2 Sheets-Sheet 2

INVENTORS
DONALD W. BEEM
BY RAMON E. CONRAD
ATTORNEY

United States Patent Office 2,970,793
Patented Feb. 7, 1961

2,970,793
AIRCRAFT

Donald W. Beem, Gahanna, and Ramon E. Conrad, Westerville, Ohio, assignors to North American Aviation, Inc.

Filed Feb. 14, 1958, Ser. No. 715,285

6 Claims. (Cl. 244—121)

This invention relates generally to aircraft, and more particularly pertains to an improved airplane having a novel method and means for forcibly removing an aircraft canopy component or the like in an emergency escape situation.

Modern high-performance aircraft typically utilize ballistically powered ejection seats in connection with the provision of escape capability for operating personnel. Many aircraft emergency escape systems further utilize saparate means for unlatching and/or removing the crew compartment enclosure members in emergency bail-out procedures, and generally such means are movably, mechanically, disassociated from the powered ejection seat. Systems based upon this design philosophy may utilize negative air pressures to source the canopy removal forces required subsequent to canopy release.

However, conventional escape systems on occasion do prove deficient, particularly when a mechanical malfunction of the unlatching means is encountered, or when proper canopy removal is not fully effected. In such situations the pilot and ejection seat are commonly forcefully driven through the enclosure member; this in turn may result in injury to the pilot, or may damage operative components of the ejection seat, or may impede phases of a critically timed escape sequence.

Accordingly, it is an object of this invention to provide an improved airplane wherein the ejection seat component thereof may be catapulted from within a crew compartment, as during an emergency escape procedure, with positive assurance that the seat and the person positioned therein will not be adversely physically affected by the compartment enclosure member associated therewith.

Another object of our invention is to provide an ejection seat and canopy construction for aircraft that is arranged such that movement of the ejection seat may be utilized to disengage the canopy member from latching means associated therewith.

Another object of this invention is to provide an improved aircraft construction wherein a powered ejection seat provided in the aircraft for emergency escape use may be utilized to release an associated crew compartment enclosure member from restraint by actuator means provided in the aircraft for normal opening and closing of the enclosure member.

Another object of this invention is to provide an aircraft construction wherein a powered ejection seat is utilized to cause movement of a canopy member relative to the aircraft's air-frame, especially from a closed position to an open position.

A still further object of this invention is to provide an aircraft canopy removal method for use in conjunction with an emergency escape sequence that will not cause any phase of the sequence to be impeded, and that will not adversely modify the designed-for characteristics of the ejection seat departure trajectory contemplated therein.

Another object of this invention is to provide an improved aircraft having an ejection seat and canopy arrangement which may be easily fabricated, which may be readily maintained in an operating condition, and which has an extremely high degree of operational reliability.

Other objects and advantages of our invention will become apparent during consideration of the drawings and detailed description provided herein.

In the drawings, wherein like numerals are utilized to reference like components throughout the same:

Fig. 1 is a perspective view of an airplane;

Fig. 2 is a perspective view of a portion of the airplane of Fig. 1 illustrating details of this invention as utilized therein;

Fig. 3 is a perspective view of the ejection seat which is partially illustrated in Fig. 2;

Figs. 4 and 5 illustrate, in greater detail, a portion of the release means shown in Fig. 3; and Figs. 6 through 9 illustrate various operative positions of the ejection seat and canopy components utilized in the practice of this invention.

Figure 7:
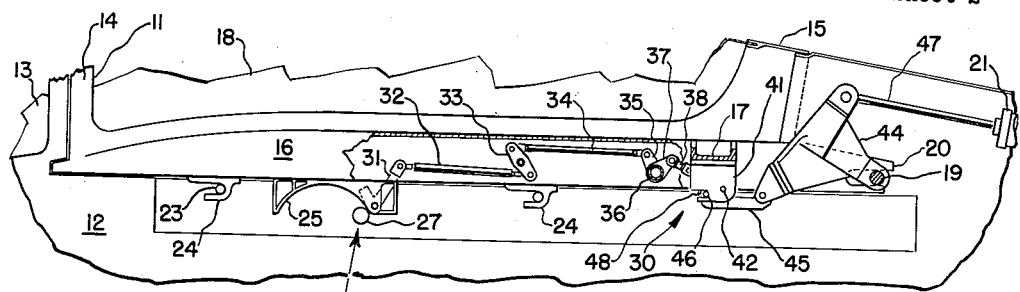

A typical high-performance airplane 10 is illustrated perspectively in Fig. 1 with its canopy component 11 supported by and secured to the fuselage portion 12 of the airplane. When in its closed position, canopy 11 is latched to fuselage 12 and an end portion of the canopy is butted against windshield 13. Further, canopy 11 may be pivoted about an axis located at the aft portion thereof to provide access to the interior of the crew compartment which it partially defines.

With reference to Fig. 2, canopy 11 is illustrated as having a front bow 14, an aft bow 15, side beams 16 which join the front and aft bows, a cross-beam 17, and a canopy glass designated by the numeral 18. Canopy 11 is arranged to pivot about the shaft 19 carried by fuselage 12, and is provided with the cooperating forked end portions 20 which are attached to each side beam 16 for that purpose. In normal opening and closing operations, canopy 11 may be pivotally moved by actuator means 21; however, this invention contemplates that member 11 will be movably powered by ejection seat 22 in situations wherein an emergency escape sequence will be utilized.

The latching of canopy 11 to fuselage 12 in its closed relation may be accomplished through use of studs 23 and latch hooks 24. Each stud 23 is attached to and projects from an interior portion of fuselage 12, and each hook 24 is attached to the underside of a side beam 16. As canopy 11 is moved rearward along its fuselage support, and from the position shown in Figs. 2, 6, 7 and 8, the latch components will become disengaged and the canopy 11 may thereafter be pivoted about axis 19. In this connection, it should be noted that the slot provided in each side beam end portion 20 is arranged to permit rearward movement of the canopy a sufficient distance to facilitate latch disengagement.

A follower means in the form of cam 25 is provided in attached relation to canopy 11; cam 25 is intended to cooperate with a driver means 26 (Fig. 3) when canopy 11 is movably powered by ejection seat 22. In a preferred form, cooperating cam members 25 and driver means 26 are provided on each side of canopy 11 and seat 22, respectively. Driver means 26 may be comprised of a roller 27 carried by the support bracket 28. Each bracket 28 is rigidly secured to a side of seat 22, as on the tubular support 29.

A release means designated generally by the numeral 30, is provided in the Fig. 2 embodiment of this invention in order that canopy 11 might be released from those restraining effects which may be sourced in actuator means 21. Release means 30 is illustrated as being comprised essentially of: a bellcrank 31, which is pivotally attached to follower means 25 in a manner whereby it will cooperate with driver means 26; a catch link 40; and a linkage for operably coupling catch link 40 to bellcrank 31. The linkage provided for movably coupling bellcrank 31 to catch link 40 may include, in sequence; rod 32, pivot bar 33, rod 34, tube arm 35, pivot tube 36, tube arm 37, and link 38. All linkage member connections are pivotal in nature and additionally, catch link 40 is pivotally attached to bracket 41 at pivot axis 42. A notch 43 is provided in catch link 40 for purposes hereinafter noted. Bracket 41 is rigidly secured to the underside of cross-beam 17.

The means provided for movably coupling canopy 11 to actuator means 21 may include a bellcrank 44, a drop link 45, and a pin 46 carried by drop link 45. Bellcrank 44 is pivotally carried by shaft 19, has one arm pivotally connected to the rod portion 47 of actuator 21, and has its other arm pivotally coupled to drop link 45. The pin 46 carried by drop link 45 cooperates with a slot 48 contained in bracket 41, and with the notch 43 provided in catch link 40.

Movement of actuator rod 47 to the right from the position shown in Fig. 6 causes pin 46 to bear against the closed end of slot 48, draws canopy 11 aft until the closed end of the slot contained in each side beam end portion 20 bears against axis 19, whereupon the latch members 23 and 24 are completely disengaged, and then pivots canopy 11 clockwise about shaft 19. Movement of rod 40 to the left from its raised canopy position to the position shown in Fig. 6 lowers canopy 11 by permitting it to pivot counterclockwise about axis 19, and then moves canopy 11 forward to cause a latching action. In effecting the forward movement of canopy 11, the force transmitted by drop link 45 to pin 46 is in turn transmitted into canopy 11 through a bearing surface provided by notch 43, through catch link 40, and through pivot 42 of the bracket 41. As pointed out hereinbefore, bracket 41 is rigidly secured to canopy cross-beam 17.

With respect to movably powering canopy 11 by means of seat 22, reference may be made to Figs. 4 through 9, and particularly to Figs. 6 through 9. Components 27 and 28 of drive means 26 are illustrated in Fig. 6 in their normal relation to latched canopy 11.

When the ballistic or rocket charge for seat 22 is fired, seat 22 will commence to move up cooperating guide rails in the direction indicated by the line 50, and initial movement of seat 22 will move components of release means 30 to the position illustrated in Fig. 7. In connection therewith it should be noted that catch link 40 will then be disengaged from pin 46 as shown in Fig. 5. Thus, bracket 41 may be moved rearwardly relative to pin 46 even though bellcrank 44 and drop link 45 are maintained in their Fig. 6 position by actuator means 21.

Figure 8:
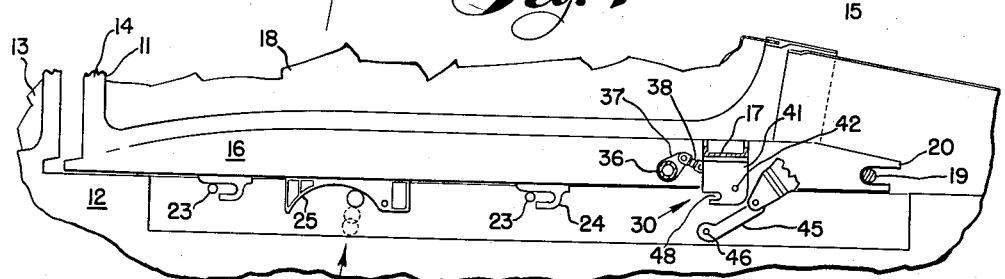

As seat 22 continues its upward movement, roller 27 bears against the curved underside of follower means 25 and moves canopy 11 rearwardly to the unlatched position shown in Fig. 8. In the process of moving canopy 11 to its Fig. 8 position, pin 46 moves out of engagement with slot 48 of bracket 41 and drop link 45 is completely disengaged from canopy 11.

Figure 9:
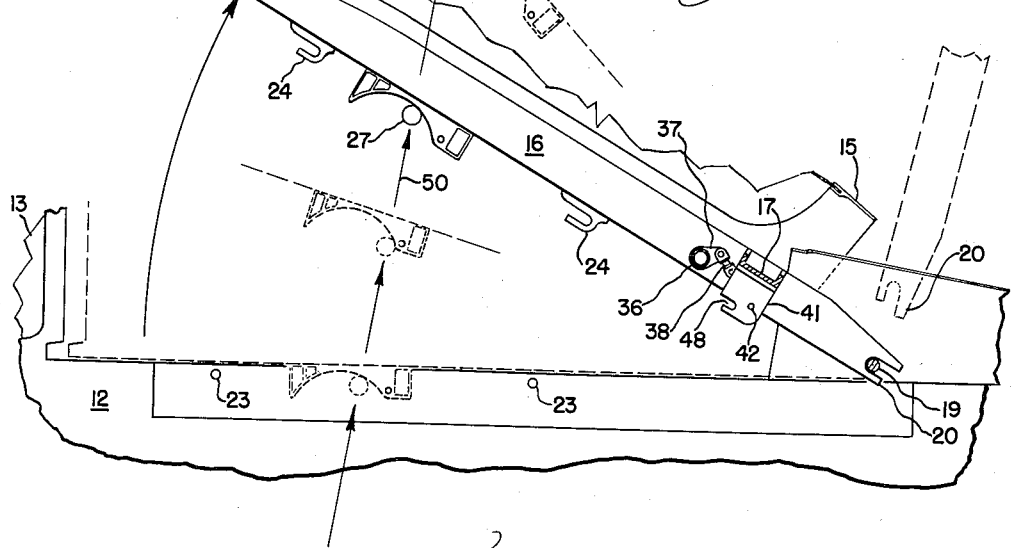

Fig. 9 illustrates the further stages of cooperation between roller 27 and cam member 25 as seat 22 continues to be catapulted from within the crew compartment of airplane 10. At its uppermost illustrated position, roller 27 commences to separate from follower 25 of canopy 11. However, at this point canopy 11 has been provided with sufficient momentum whereby it will continue to rotate eclockwise relative to fuselage portion 12 without making any further contact with a portion of seat 22 or the person positioned therein. In the case of a moving airplane, slipstream air will provide large forces for further aiding canopy removal beyond this last described point.

Thus, it will be observed that we have provided an improved aircraft having construction features which may be utilized in a manner whereby the objects outlined hereinbefore may be readily attained.

It is to be understood that the forms of the invention herewith shown and described are to be taken as preferred embodiments of the same, but that various changes in the shape, size, and arrangement of parts may be resorted to without departing from the spirit of the invention or the scope of the subjoined claims.

We claim:

1. In combination with an airplane having a crew compartment: a canopy member over said compartment, a powered ejection seat in said compartment, pivot means securing said canopy member to said airplane aft of said ejection seat, engaged latch members connected to said canopy member and to said airplane, and driver-follower means to disengage said latch members and thereafter rotate said canopy member about said pivot means, said driver-follower means having a driver portion and a separate follower portion, one of said portions being connected to said ejection seat and the other of said portions being connected to said canopy member and aligned with said one portion along the ejection path of said seat, whereby said latch members combine with said driver portion to move said follower portion relative to said driver portion and thereby disengage said latch members when said seat is ejected from within the airplane crew compartment.

2. The combination recited in claim 1, wherein said driver portion is comprised of a roller means, and wherein said follower portion is comprised of an inverted, U-shaped cam means, said roller means being connected to said ejection seat, and said cam means being connected to said canopy member.

3. The combination defined in claim 1, wherein said latch members are disengaged only by relative movement along a disengagement line which extends generally perpendicular to the ejection path of said seat, and wherein said follower portion has a cam surface which extends in a direction transverse the ejection path of said seat and which extends in a direction transverse said disengagement line, said driver portion contacting said cam surface to move said follower portion and said canopy member first along said disengagement line and afterwards about said pivot means.

4. In an airplane having a canopy positioned over a crew compartment, having engaged latch means connected to said canopy and to the airplane structure, and having a pivot connection between said canopy and the airplane structure, canopy jettison means comprising: a powered ejection seat in the airplane crew compartment, driver means secured to said ejection seat, and follower means secured to said canopy for cooperation with said driver means, said follower means having a concave cam surface extending transverse the ejection path of said driver means, and said driver means being aligned with said cam surface but more adjacent one extreme of said cam surface, whereby said engaged latch members are disengaged as said driver means moves relatively from said cam surface one extreme toward an intermediate cam surface position, and whereby said canopy is pivoted relative to aircraft structure when said driver means moves relatively from said intermediate cam surface position toward the other extreme of said cam surface.

5. In combination with an airplane having a crew compartment: canopy latch means, a canopy member over said compartment and engaged with said latch means, a powered ejection seat in said compartment, driver-follower means connected to said canopy member and connected to said ejection seat to unlatch and jettison said canopy, separate actuator means for normally unlatching and opening said canopy member, disengageable connector means secured to said canopy member and secured to said actuator means, and movable release means for disengaging said connector means, said release means being first moved by said ejection seat when said seat is ejected from within said crew compartment and said canopy member being afterwards disengaged from said latch means by said ejection seat.

6. The combination defined in claim 5, wherein said driver-follower means includes a driver portion and an aligned follower portion spaced-apart from said driver portion to provide for the releasing and unlatching of said canopy member in sequence, said release means being projected into the space intermediate said driver and follower portions to thereby provide for movement of said release means prior to movement of said canopy member when said seat is ejected from within said crew compartment.

References Cited in the file of this patent

UNITED STATES PATENTS

| | | |
|---|---|---|
| 2,671,622 | Saulnier | Mar. 9, 1954 |
| 2,673,050 | Patch et al. | Mar. 23, 1954 |
| 2,699,305 | Turner et al. | Jan. 11, 1955 |
| 2,806,666 | Brown et al. | Sept. 17, 1957 |
| 2,806,667 | Kugler | Sept. 17, 1957 |
| 2,820,602 | Foster | Jan. 21, 1958 |
| 2,829,850 | Culver | Apr. 8, 1958 |
| 2,832,553 | Wallenhorst | Apr. 29, 1958 |

FOREIGN PATENTS

| | | |
|---|---|---|
| 743,776 | Great Britain | Jan. 25, 1956 |
| 763,581 | Great Britain | Dec. 12, 1956 |